United States Patent
Yang

(10) Patent No.: US 11,659,024 B2
(45) Date of Patent: May 23, 2023

(54) STATUS UPDATES IN A 5G CORE NETWORK

(71) Applicant: Telefonaktiebolaget LM Ericsson (publ), Stockholm (SE)

(72) Inventor: Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/761,539

(22) PCT Filed: Nov. 27, 2017

(86) PCT No.: PCT/EP2017/080479
§ 371 (c)(1),
(2) Date: May 5, 2020

(87) PCT Pub. No.: WO2019/101340
PCT Pub. Date: May 31, 2019

(65) Prior Publication Data
US 2020/0267214 A1    Aug. 20, 2020

(51) Int. Cl.
*H04L 67/101* (2022.01)
*H04L 67/1008* (2022.01)
*H04L 67/02* (2022.01)
*H04L 67/1036* (2022.01)
*H04L 67/63* (2022.01)

(52) U.S. Cl.
CPC .......... *H04L 67/1008* (2013.01); *H04L 67/02* (2013.01); *H04L 67/1036* (2013.01); *H04L 67/63* (2022.05)

(58) Field of Classification Search
CPC . H04L 67/02; H04L 67/1002; H04L 67/1008; H04L 67/1036; H04L 67/327
See application file for complete search history.

(56) References Cited

U.S. PATENT DOCUMENTS

| 2017/0303259 | A1  | 10/2017 | Lee et al. |
| 2018/0288170 | A1* | 10/2018 | Yin .......................... H04W 4/00 |
| 2019/0238425 | A1* | 8/2019  | Mladin ............... H04L 41/5048 |
| 2020/0252813 | A1* | 8/2020  | Li .......................... H04W 24/08 |
| 2020/0296571 | A1* | 9/2020  | Puente Pestana ....... H04W 8/18 |
| 2020/0336937 | A1* | 10/2020 | Youn ....................... H04W 8/08 |
| 2021/0112443 | A1* | 4/2021  | Krishan ................ H04W 28/26 |

OTHER PUBLICATIONS

Journal of ICT Standardization vol. 6, No. 1-2 (Jan. and May 2018) (Year: 2018).*

(Continued)

*Primary Examiner* — June Sison
(74) *Attorney, Agent, or Firm* — Coats & Bennett, PLLC

(57) ABSTRACT

The present invention relates to a method for enabling status updates in a 5G core network. The method is performed in a network function (NF), service producer node and comprises sending (S310) a hypermedia message to an NF repository function (NRF), wherein the hypermedia message comprises an NF status indication and a hypermedia link for query of current NF status of the service producer, receiving (S350) a hypermedia message from a service consumer by the hypermedia link, which hypermedia message request a current NF status of the service producer, and sending (S360) the current NF status to the service consumer in response to the received request.

14 Claims, 6 Drawing Sheets

(56) References Cited

OTHER PUBLICATIONS

3GPP TS 23.501 v1.5.0 (Nov. 3, 2017) to 3GPP ("3GPP 23.501") (Year: 2017).*
3GPP TS 23.502 v1.5.0 (Nov. 3, 2017) to 3GPP ("3GPP 23.502") (Year: 2017).*
3rd Generation Partnership Project, "3rd Generation Partnership Project; Technical Specification Group Services and System Aspects; System Architecture for the 5G System; Stage 2 (Release 15)", Technical Specification, 3GPP TS 23.501 V1.4.0, Sep. 1, 2017, pp. 1-151, 3GPP.
3rd Generation Partnership Project, "3rd Generation Partnership Project; Technical Specification Group Services and System Aspects; Procedures for the 5G System; Stage 2 (Release 15)", Technical Specification, 3GPP TS 23.502 V1.2.0, Sep. 1, 2017, pp. 1-165, 3GPP.
3rd Generation Partnership Project, "3rd Generation Partnership Project; Technical Specification Group Core Network and Terminals; 5G System—Phase 1; CT WG4 Aspects (Release 15)", Technical Report, 3GPP TR 29.891 V1.1.0, Oct. 1, 2017, pp. 1-151, 3GPP.
3rd Generation Partnership Project, "3rd Generation Partnership Project; Technical Specification Group Core Network and Terminals; 5G System; Access and Mobility Management Services; Stage 3 (Release 15)", Technical Specification, 3GPP TS 29.518 V0.2.0, Oct. 1, 2017, pp. 1-46, 3GPP.
3rd Generation Partnership Project, "3rd Generation Partnership Project; Technical Specification Group Core Network and Terminals; 5G System; Session Management Services; Stage 3 (Release 15)", Technical Specification, 3GPP TS 29.502 V0.2.0, Oct. 1, 2017, pp. 1-21, 3GPP.
3rd Generation Partnership Project, "3rd Generation Partnership Project; Technical Specification Group Core Network and Terminals; 5G System; Network Function Repository Services; Stage 3 (Release 15)", Technical Specification, 3GPP TS 29.510 V0.2.0, Oct. 1, 2017, pp. 1-20, 3GPP.
Nokia et al., "Pseudo-CR on Solution for NF Service Discovery", 3GPP TSG CT4 Meeting #79, Krakow, Poland, Aug. 21, 2017, pp. 1-7, C4-174331, 3GPP.
3rd Generation Partnership Project, "3rd Generation Partnership Project; Technical Specification Group Core Network and Terminals; 5G System—Phase 1; CT WG4 Aspects (Release 15)", Technical Report, 3GPP TR 29.891 V0.3.0, May 2017, pp. 1-80, 3GPP.

* cited by examiner

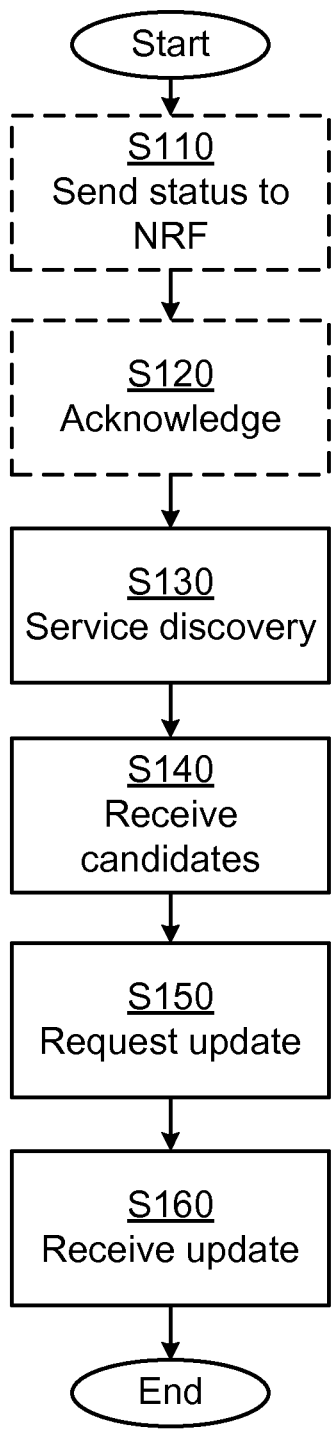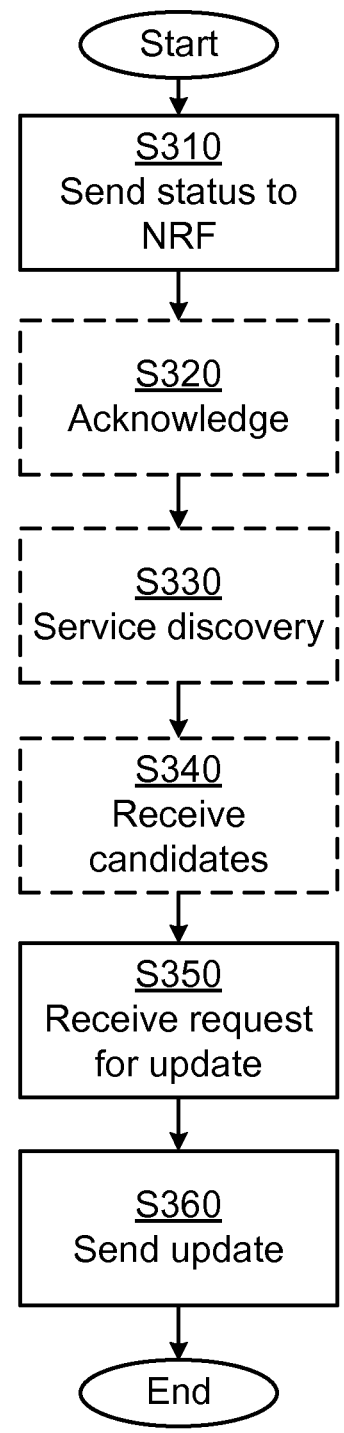
Fig. 3
Fig. 4

STATUS UPDATES IN A 5G CORE NETWORK

TECHNICAL FIELD

The invention relates to methods for enabling of status updates in a 5G core network, NF service producer nodes, NF service consumer nodes, and computer programs thereof.

BACKGROUND

When a client based service discovery solution is used in a 5G core network (5GC), it is the client's responsibility to achieve load balancing among the application servers. The client is in the 5GC the service consumer, and the to application servers are in the 5GC the service producers. Mechanisms for providing load information to the service consumers in the 5GC are discussed in the 3rd Generation Partnership Project (3GPP) Technical Specification 23.502 Group on Service and System Aspects (SA2).

The 3GPP SA2 has specified a few Network Repository Function (NRF) services in Table 5.2.7.1-1: network function (NF) Services provided by the NRF

| Service Name | Service Operations | Operation Semantics | Example Consumer(s) |
|---|---|---|---|
| Nnrf_NFManagement | NFRegister | Request/Response | AMF, SMF, UDM, AUSF, NEF, PCF, SMSF |
|  | NFUpdate | Request/Response | AMF, SMF, UDM, AUSF, NEF, PCF, SMSF |
|  | NFDeregister | Request/Response | AMF, SMF, UDM, AUSF, NEF, PCF, SMSF |
| Nnrf_NFStatus | Subscribe | Subscribe/Notify | AMF, SMF, PCF, NEF |
|  | Notify |  | AMF, SMF, PCF, NEF |
|  | UnSubscribe |  | AMF, SMF, PCF, NEF |
| Nnrf_NFDiscovery | Request | Request/Response | AMF, SMF, PCF, NEF, NRF, NSSF |

The 3GPP SA2 has also specified the following NRF services in 5.2.7.4

Nnrf_NFStatus service, 5.2.7.4.1 General: 5.2.7.4.2

Nnrf_NFStatus_Subscribe, 5.2.7.4.3 Nnrf_NFStatus_Notify and 5.2.7.4.4 and Nnrf_NFStatus_UnSubscribe.

Service name: Nnrf_NFStatus_Subscribe.

Description: Consumer can subscribe to be notified of newly registered NF along with its NF services.

Known NF Consumers: Access and Mobility Management Function (AMF), to Session Management Function (SMF), Policy Control Function (PCF), and Network Exposure Function (NEF).

Inputs, Required: NF type of the target NF, NF ID, NF services.

Inputs, Optional: None.
Outputs, Required: None.
Outputs, Optional: None.

Alternatively, other means such as Operations, Administration and Maintenance (OA&M) can also be used to subscribe for NF status.

Service name: Nnrf_NFStatus_notify.

Description: NRF notifies subscribed consumers of newly registered NF along with its NF services.

Known NF Consumers: AMF, SMF, PCF, and NEF.
Inputs, Required: NF ID, Status, NF services.
Inputs, Optional: None.
Outputs, Required: None.
Outputs, Optional: None.

Service name: Nnrf_NFStatus_UnSubscribe.

Description: Consumer can unsubscribe from being notified of newly to registered NF along with its NF services.

Known NF Consumers: AMF, SMF, PCF, and NEF.
Inputs, Required: NF type of the target NF, NF ID.
Inputs, Optional: None.
Outputs, Required: None.
Outputs, Optional: None.

Alternatively, other means such as OA&M can also be used to unsubscribe for NF status.

SUMMARY

An object of embodiments presented herein is how to enable status updates effectively in a 5G core network.

The solutions presented herein are applicable for 5G Core Network where the communication on the control plane is based on service based architecture, which is aiming for a cloud native implementation, e.g. using container system to support each NF service, to effectively enable independent evolvement of different NF Service.

According to a first aspect there is presented a method for enabling status updates in a 5G core network. The method is performed in a network function (NF) service producer node and comprises sending a hypermedia message to an NF repository function (NRF), wherein the hypermedia message comprises an NF status indication and a hypermedia link for query of current NF status of the service producer, receiving a hypermedia message from a service consumer by the hypermedia link, which hypermedia message to request a current NF status of the service producer, and sending the current NF status to the service consumer in response to the received request.

The sent hypermedia message may further comprise an indication of available hypermedia communication procedures.

The hyper media messages may be Hypertext Transfer Protocol (HTTP) messages or Constrained Application Protocol (CoAP) messages.

The NF status may comprise load and/or overload information for the service producer.

The method may further comprise receiving an acknowledge response from the NRF in response to the sending.

According to a second aspect there is presented a method for enabling status updates in a 5G core network. The method is performed in an NF service consumer node and comprises sending a service discovery message to an NRF requesting a service producer candidate, receiving a list comprising one or more candidates for the requested service producer, wherein the list comprises an indication of NF status for each candidate service provider in the list as well as a hypermedia link for query of current NF status of each candidate service provider in the list, sending a hypermedia request to one or more service producers in the received list, requesting a current NF status, utilizing the received hypermedia links, and receiving a current NF status from the one or more service producers in response to the sent request.

The received list may further comprise an indication of available hypermedia communication procedures for each candidate.

The hyper media messages may be HTTP messages or CoAP messages.

The NF status may comprise load and/or overload information for the service producer. The method may further comprise receiving a current NF load and/or overload information from more than one service producer, and requesting services from one or more service producers in response to the to received current NF load and/or overload information. The requesting services may comprise selection to achieve load balancing among the service producers. The requesting services may comprise selection to throttle signalling to mitigate an overload of a service producer.

According to a third aspect there is presented a method for enabling status updates in a 5G core network. The method is performed in an NF service producer node and comprises receiving a subscription request from a service consumer, wherein the subscription request is a hypermedia message comprising a request for an NF status of the service producer, sending a hypermedia message to the service consumer in response the received subscription request, wherein the hyper media message comprises an indication of subscription acknowledgment and a current NF status of the service producer, and sending a subsequent hypermedia message to the service consumer subsequent to the sent indication of subscription acknowledgement to the service consumer, wherein the subsequent hypermedia message comprises an indication of changed NF status and a current NF status of the service producer.

The subscription request may comprise an NF status update frequency condition.

The hyper media messages may be HTTP messages or CoAP messages.

The NF status may comprise load and/or overload information for the service producer.

The method may further comprise receiving a subscription request update from the service consumer, wherein the subscription request update is a hypermedia message comprising an updated request for an NF status of the service producer, which updated request differs from the previously received request, and sending an indication of subscription update acknowledgment to the service consumer.

According to a fourth aspect there is presented a method for enabling status to updates in a 5G core network. The method is performed in an NF service consumer node and comprises sending a subscription request to a service producer, wherein the subscription request is a hypermedia message comprising a request for an NF status of the service producer, receiving a hypermedia message from the service consumer in response the sent subscription request, wherein the hyper media message comprises an indication of subscription acknowledgment and a current NF status of the service producer, and receiving a subsequent hypermedia message from the service producer subsequent to the received indication of subscription acknowledgement from the service producer, wherein the subsequent hypermedia message comprises an indication of changed NF status and a current NF status of the service producer.

The subscription request may comprise an NF status update frequency condition.

The hyper media messages may be HTTP messages or CoAP messages. The NF status may comprise load and/or overload information for the service producer.

The method may further comprise sending a subscription request update to the service producer, wherein the subscription request is a hypermedia message comprising an updated request for NF status of the service producer, which updated request differs form the previously sent request, and receiving an indication of subscription update acknowledgment from the service provider.

According to a fifth aspect there is presented an NF service producer node for enabling status updates in a 5G core network. The NF service producer node comprises a processor and a computer program product storing instructions that, when executed by the processor, causes the NF service producer node to send a hypermedia message to an NRF, wherein the hypermedia message comprises an NF status indication and a hypermedia link for query of current to NF status of the service producer, to receive a hypermedia message from a service consumer by the hypermedia link, which hypermedia message request a current NF status of the service producer, and to send the current NF status to the service consumer in response to the received request.

According to a sixth aspect there is presented an NF service consumer node for enabling status updates in a 5G core network. The NF service consumer node comprises a processor and a computer program product storing instructions that, when executed by the processor, causes the NF service consumer node to send a service discovery message to an NRF, requesting a service producer candidate, to receive a list comprising one or more candidates for the requested service producer, wherein the list comprises an indication of NF status for each candidate service provider in the list as well as a hypermedia link for query of current NF status of each candidate service provider in the list, to send a hypermedia request to one or more service producers in the received list, requesting a current NF status, utilizing the received hypermedia links, and to receive a current NF status from the one or more service producers in response to the sent request.

According to a seventh aspect there is presented an NF service producer node for enabling status updates in a 5G core network. The NF service producer node comprises a processor and a computer program product storing instructions that, when executed by the processor, causes the NF service producer node to receive a subscription request from a service consumer, wherein the subscription request is a hypermedia message comprising a request for an NF status of the service producer, to send a hypermedia message to the service consumer in response the received subscription request, wherein the hyper media message comprises an indication of subscription acknowledgment and a current NF status of the service producer, and to send a subsequent hypermedia message to the service consumer subsequent to the sent indication of subscription acknowledgement to the service consumer, wherein the subsequent hypermedia message comprises an indication of changed NF status and a to current NF status of the service producer.

According to an eighth aspect there is presented an NF service consumer node for enabling status updates in a 5G core network. The NF service consumer node comprises a processor and a computer program product storing instructions that, when executed by the processor, causes the NF service consumer node to send a subscription request to a service producer, wherein the subscription request is a hypermedia message comprising a request for an NF status of the service producer, to receive a hypermedia message from the service consumer in response the sent subscription request, wherein the hyper media message comprises an indication of subscription acknowledgment and a current NF status of the service producer, and to receive a subsequent hypermedia message from the service producer subsequent to the received indication of subscription acknowledgement from the service producer, wherein the subsequent hypermedia message comprises an indication of changed NF status and a current NF status of the service producer.

According to a ninth aspect there is presented an NF service producer node for enabling status updates in a 5G core network. The NF service producer node comprises a communication manager for sending a hypermedia message to an NRF, wherein the hypermedia message comprises an NF status indication and a hypermedia link for query of current NF status of the service producer, for receiving a hypermedia message from a service consumer by the hypermedia link, which hypermedia message request a current NF status of the service producer, and for sending the current NF status to the service consumer in response to the received request.

According to a tenth aspect there is presented an NF service consumer node for enabling status updates in a 5G core network. The NF service consumer node comprises a communication manager for sending a service discovery message to an NRF, requesting a service producer candidate, for receiving a list comprising one or more candidates for the requested service producer, wherein the list comprises an indication of NF status for each candidate service provider in the list as well as a hypermedia link for query of current to NF status of each candidate service provider in the list, for sending a hypermedia request to one or more service producers in the received list, requesting a current NF status, utilizing the received hypermedia links, and for receiving a current NF status from the one or more service producers in response to the sent request.

According to an eleventh aspect there is presented an NF service producer node for enabling status updates in a 5G core network. The NF service producer node comprises a communication manager for receiving a subscription request from a service consumer, wherein the subscription request is a hypermedia message comprising a request for an NF status of the service producer, for sending a hypermedia message to the service consumer in response the received subscription request, wherein the hyper media message comprises an indication of subscription acknowledgment and a current NF status of the service producer, and for sending a subsequent hypermedia message to the service consumer subsequent to the sent indication of subscription acknowledgement to the service consumer, wherein the subsequent hypermedia message comprises an indication of changed NF status and a current NF status of the service producer.

According to a twelfth aspect there is presented an NF service consumer node for enabling status updates in a 5G core network. The NF service consumer node comprises a communication manager for sending a subscription request to a service producer, wherein the subscription request is a hypermedia message comprising a request for an NF status of the service producer, for receiving a hypermedia message from the service consumer in response the sent subscription request, wherein the hyper media message comprises an indication of subscription acknowledgment and a current NF status of the service producer, and for receiving a subsequent hypermedia message from the service producer subsequent to the received indication of subscription acknowledgement from the service producer, wherein the subsequent hypermedia message comprises an indication of changed NF status and a current NF status of the service producer.

According to thirteenth aspect there is presented a computer program for enabling status updates in a 5G core network. The computer program comprises computer program code which, when run on an NF service producer node, causes the NF service producer node to send a hypermedia message to an NRF, wherein the hypermedia message comprises an NF status indication and a hypermedia link for query of current NF status of the service producer, to receive a hypermedia message from a service consumer by the hypermedia link, which hypermedia message request a current NF status of the service producer, and to send the current NF status to the service consumer in response to the received request.

According to a fourteenth aspect there is presented a computer program for enabling status updates in a 5G core network. The computer program comprises computer program code which, when run on an NF service consumer node, causes the NF service consumer node to send a service discovery message to an NRF, requesting a service producer candidate, to receive a list comprising one or more candidates for the requested service producer, wherein the list comprises an indication of NF status for each candidate service provider in the list as well as a hypermedia link for query of current NF status of each candidate service provider in the list, to send a hypermedia request to one or more service producers in the received list, requesting a current NF status, utilizing the received hypermedia links, and to receive a current NF status from the one or more service producers in response to the sent request.

According to a fifteenth aspect there is presented a computer program for enabling status updates in a 5G core network. The computer program comprises computer program code which, when run on an NF service producer node, causes the NF service producer node to receive a subscription request from a service consumer, wherein the subscription request is a hypermedia message comprising a request for an NF status of the service producer, to send a hypermedia message to the service consumer in response the received subscription request, wherein the hyper media message comprises an indication of subscription acknowledgment and a current NF to status of the service producer, and send a subsequent hypermedia message to the service consumer subsequent to the sent indication of subscription acknowledgement to the service consumer, wherein the subsequent hypermedia message comprises an indication of changed NF status and a current NF status of the service producer.

According to a sixteenth aspect there is presented a computer program for enabling status updates in a 5G core network. The computer program comprises computer program code which, when run on an NF service consumer node, causes the NF service consumer node to send a subscription request to a service producer, wherein the subscription request is a hypermedia message comprising a request for an NF status of the service producer, to receive a hypermedia message from the service consumer in response the sent subscription request, wherein the hyper media message comprises an indication of subscription acknowledgment and a current NF status of the service producer, and to receive a subsequent hypermedia message from the service producer subsequent to the received indication of subscription acknowledgement from the service producer, wherein the subsequent hypermedia message comprises an indication of changed NF status and a current NF status of the service producer.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the to accompanying drawings, in which:

FIGS. 3 to 6 are flowcharts illustrating methods for embodiments presented herein;

DETAILED DESCRIPTION

Figure 1:
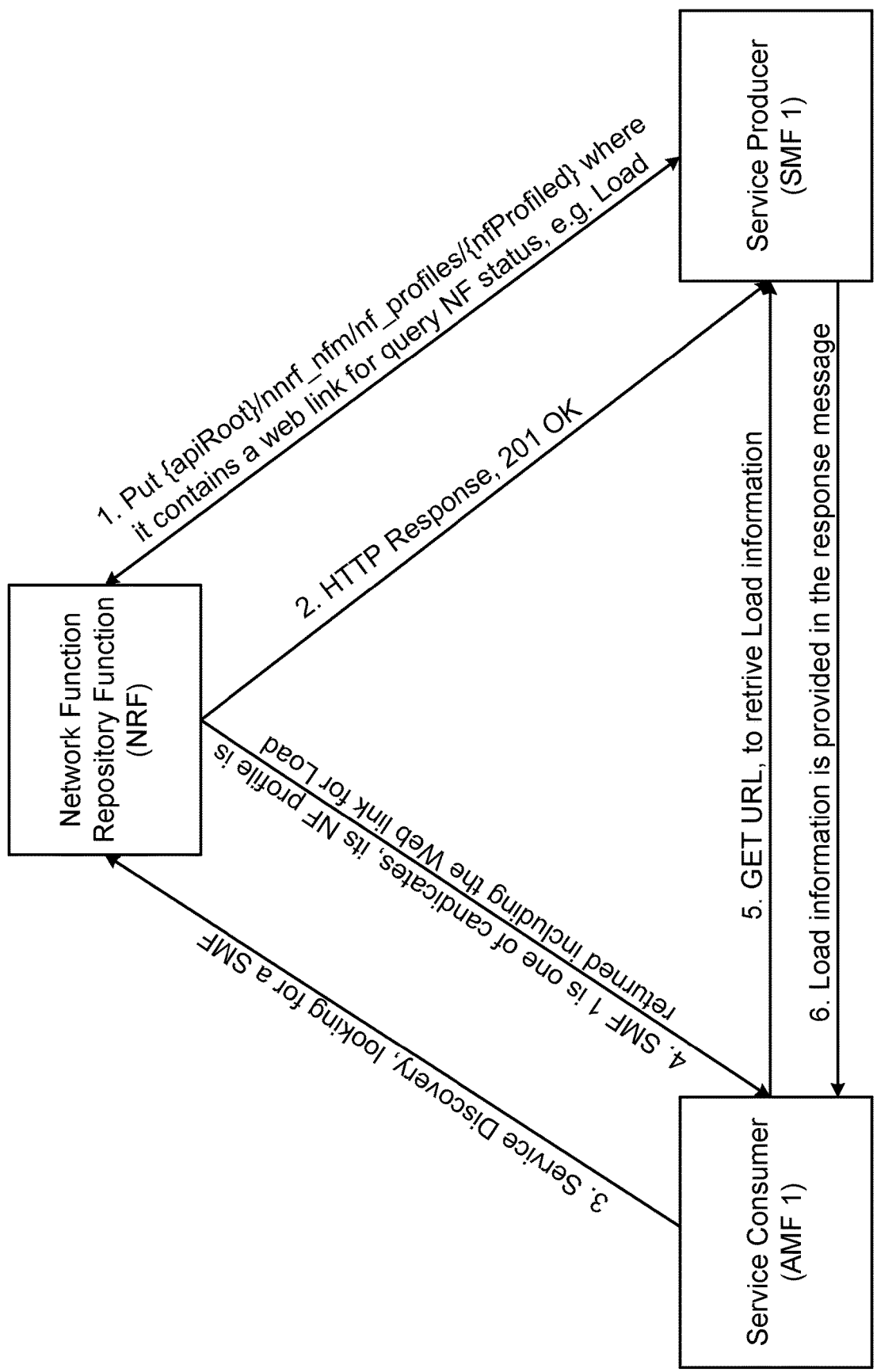
FIG. 1 schematically illustrates a method for enabling status updates in a 5G core network according to an embodiment.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In addition to the Network Repository Function (NRF) services described above, 3rd Generation Partnership Project (3GPP) Technical Specification 23.502 Group on Service and System Aspects (SA2) has also specified some event exposure functions for some Network Functions (NFs) for an Access and Mobility Management Function (AMF) NF.

The AMF may offer this service as a service provider to enable an NF to subscribe and get notified about an event. The known service consumers are Network Exposure Function (NEF), Session Management Function (SMF), Policy Control Function (PCF), and Unified Data Management (UDM).

The following user equipment (UE) mobility information events are considered:
- Location changes (Tracking Area Code (TAI), Cell ID, Non-3GPP Interworking Function (N3IWF) node, UE local IP address and optionally User Datagram Protocol (UDP) source port number);
- Access network (AN) type changes (3GPP access or non-3GPP access);
- Registration state changes (Registered or Deregistered);
- Connectivity state changes (IDLE or CONNECTED);
- UE loss of communication;
- UE reachability status along with optional list of sessions to be activated;
- Mobility statistics and
- UE indication of switching off Short Message Service (SMS) over Non-Access Stratum (NAS) service.

To support external exposure of network capabilities, the AMF may be required to notify the NEF if the following event is subscribed as described in clause 5.4.2 of 3GPP TS 23.502.

TABLE 5.4.2-1

List of event for monitoring capability, applicable to the AMF

| Event | Description | Which NF detects the event |
|---|---|---|
| Loss of Connectivity | Network detects that the UE is no longer reachable for either signalling or user plane communication. | AMF |
| UE reachability | It indicates when the UE becomes reachable for sending either SMS or downlink data to the UE, which is detected when the UE transitions to CONNECTED mode or when the UE will become reachable for paging, e.g., periodic registration update timer. | AMF |
| Location Reporting | It indicates either the Current Location or the Last Known Location of a UE. One-time and Continuous Location Reporting are supported for the Current Location. For Continuous Location Reporting the serving node(s) sends a notification every time it becomes aware of a location change, with the granularity depending on the accepted accuracy of location, (see NOTE 1) For One-time Reporting is supported only for the Last Known Location. | AMF |
| Communication failure | It is identified by RAN/NAS release code | AMF |
| Availability after DNN failure | It indicates when there has been some data delivery failure followed by the UE becoming reachable. | AMF |
| Number of UEs present in a geographical area | It indicates the number of UEs that are in the geographic area described by the AF. The AF may ask for the UEs that the system knows by its normal operation to be within the area (Last Known Location) or the AF may request the system to also actively look for the UEs within the area (Current Location). | AMF |

NOTE 1:
Location granularity for event request, or event report, or both could be at cell level (Cell ID), TA level or other formats e.g. shapes (e.g. polygons, circles, etc.) or civic addresses (e.g. streets, districts, etc.) which can be mapped by NEF.
NOTE 2:
Roaming status means whether the UE is in HPLMN or VPLMN.
NOTE 3:
Aforementioned list of monitoring events is not exhaustive.

In 3GPP Technical Report (TR) 29.891, the related provision of Load/Overload information is recaptured here:

6.2.2.2.1.7 Load/Overload Control

Load Control and Overload Control mechanisms require conveyance of corresponding information between Network Functions i.e. from NF Service Producer to NF Service Consumer in HTTP response messages, to be taken into account by the NF Service Consumer e.g. for load sharing or to mitigate overload situations at subsequent service requests. This functionality can be achieved e.g. by transporting load/overload information in HTTP response messages as additional information piggybacked. The data conveyed and the associated procedures may be defined inline with Rel-12 mechanisms defined for Diameter and GTP based protocols.

As an alternative mechanism, a centralized solution via the NRF may be considered. This alternative assumes that load/overload information of the NF Service Producer is sent to the NRF and can be retrieved by or pushed to the NF Service Consumer.

A further solution has also been proposed:

6.8.2.1.1 Solution Description

The NRF exhibits a service based interface, designed according to the general design principles of the 5GC Service Based Architecture, enabling:

- a NF Service Producer to register (or de-register) its NF instance information and the list of services it supports to the NRF, according to the requirements specified in subclause 6.8.1.4;
- a NF Service Consumer to discover NF Service Producer instances supporting a specific NF type and NF service(s) according to the requirements specified in subclause 6.8.1.2;
- a NF Service Consumer to subscribe (or unsubscribe) to load level updates, registration events and/or other information, for specific NF type(s), NF service(s) and/or NF instance(s) according to the requirements specified in subclause 6.8.1.2;
- the NRF to notify NF instances about load level updates and/or subscribed registration events according to the requirements specified in subclause 6.8.1.2.

NFs exhibits a service based interface, designed according to the general design principles of the 5GC Service Based Architecture, enabling:

- the NRF to subscribe to the NF instance's load level updates;
- the NF instance to notify the NRF about load level updates;
- the NRF to check the aliveness of the NF instance (heartbeat).

The alternative solutions as recited above are however not really efficient, or to do not fit into a service based 5G core network (5GC).

Piggybacking load information in a response message from a server (or, NF service producer) is in line with the solution that is used in Evolved Packet Core Network (EPC). This solution requires the client to build an entry for each server that it has communicated with in its memory, and then store any subsequent update for such information. This will however only be used when the server is considered as a candidate, i.e. when the client performs a server selection function, e.g. during a Packet Data Network Gateway (PGW) (as a server) selection procedure by a Mobility Management Entity (MME) (as a client, which is a 4G use case), or during a SMF (as a service producer) selection procedure performed by an AMF (as a service consumer). This is not very efficient.

Using NRF as presented above, is to require the service producer to use an update registration procedure to update its load information, and store such information as an NF profile. However, when a service consumer retrieves such NF profile information, it will cache it for some time, and therefore such load information may be out-of-date when used.

An embodiment for status updates via NRF in a 5GC is illustrated in FIG. 1. The embodiment shows updates of load information, as an example of status updates, using an NRF service registration/update procedure.

A service producer SMF1 makes a service registration via consuming the NRF service Nnrf_NFManagement, using service operation NFRegister. During this procedure, load information is provided as one of the attributes in the NF profile. However, the load information is provided in a form using a Uniform Resource Locator (URL), a sink URL, a.k.a. a notification URL, where the receiver of this information, here the NRF, can fetch the load information of to this service provider using HTTP methods, e.g. GET, or PATCH/POST/PUT, to retrieve the load information at any time. The load (and/or overload) information provided via this URL can be part of NF node status information, e.g. load as a sub-resource, or an attribute of NF Status, e.g. NRF fetch "load" information of a service producer via using GET through provided notification URL, and it will get a response containing at least the load information. Such a procedure can also be considered as a health check procedure, or heartbeat procedure, i.e. if the response is received, then the service producer is alive.

In the step one, when the SMF1 register itself, it provides a URL, as part of NF Profile, e.g. by Put {apiRoot}/nnrf_nfm/nf_profiles/{nfProfiled} which contains a web link for query NF status, i.e. load. The following JavaScript Object Notation (JSON) representation may e.g. be used:

```
{
    "links": [{
        "href": "https://{apiRoot}/nsmf_pdus/v1/nf_status/loadInfo"
        "rel": "self",
        "method": "GET"
    }]
}
```

The NRF, on success, returns 201 created in step two. The payload body of the PUT response contains the representation of the created resource and the location header contains the Uniform Resource Identifier (URI) of the created resource.

The notification URL can now be used to get the load information of the NF service producer, and is part of the NF profile to be provided to an NF service consumer during a service discovery procedure. For example, a service consumer AMF1, in step three, performs a service discovery procedure, e.g. Nnrf_Discovery, using service operation Request, towards the NRF, looking for a service which may be offered e.g. by the service producer SMF1. The service producer SMF1 is in the candidate list in the response message sent, in step four, by the NRF. In this response message, the load information of service producer SMF1 is also provided to the service consumer. The service consumer can thus now retrieve the current load information of each service producers in the response message from the NRF, and decide to select which service producer to use for the requested service, e.g. to achieve load balancing among the service producers. The retrieval of a current load information is thus only needed to be utilized when the AMF1 actually performs the selection function. To retrieve the current load information, the AMF1, in step five, uses GET URL, and in step six, receives the load information.

Figure 11:
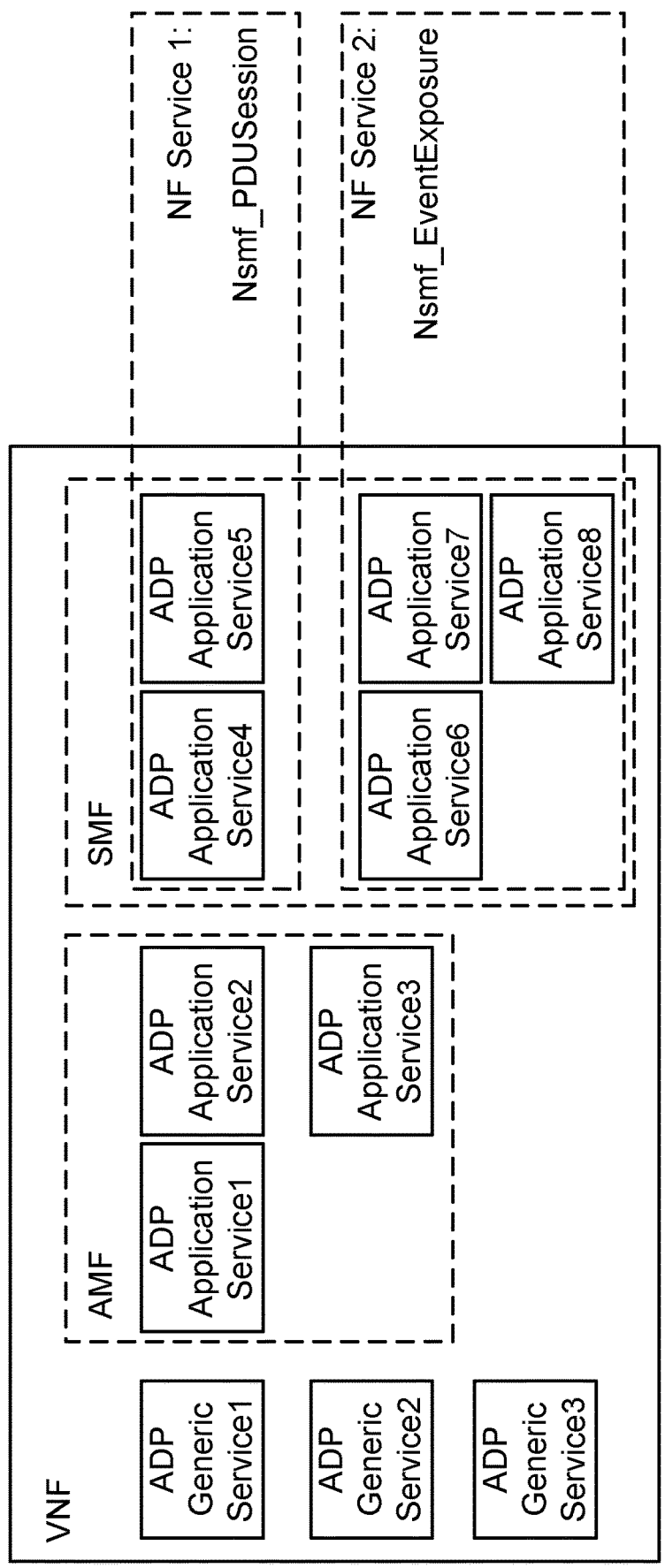
FIG. 11 schematically illustrates an orchestration function for the embodiment illustrated in FIG. 1.

An embodiment for status updates via NRF in a 5GC is illustrated in FIG. 11. The embodiment presents a cloud native implementation of the embodiment illustrated in FIG. 1, e.g. using container system to support each NF service, to effectively enable independent evolvement of different NF Service. A Virtual Network Function (VNF) is shown having Application Delivery Platforms (ADPs), as well as generic services 1-3, also application AMF application services 1-3 and SMF application services 4-8. SMF application services 4 and may support NF service 1: Nsmf_PDUSession, and SMF application services 6 to 7 may support NF service 2: Nsmf_EventExposure. The URL provided by the SMF may not be pointing to the service producer itself, it may be linked to orchestration function, which is responsible to instantiate a new instance of application services (3GPP services). The URL may point to ADP/generic. In the SMF instance, there are a couple of different NF services (Nsmf_PDUSession, Nsmf_event_exposure) wherein different URLs may be provided per NF services, to retrieve the load/overload information on the service level.

Figure 2:
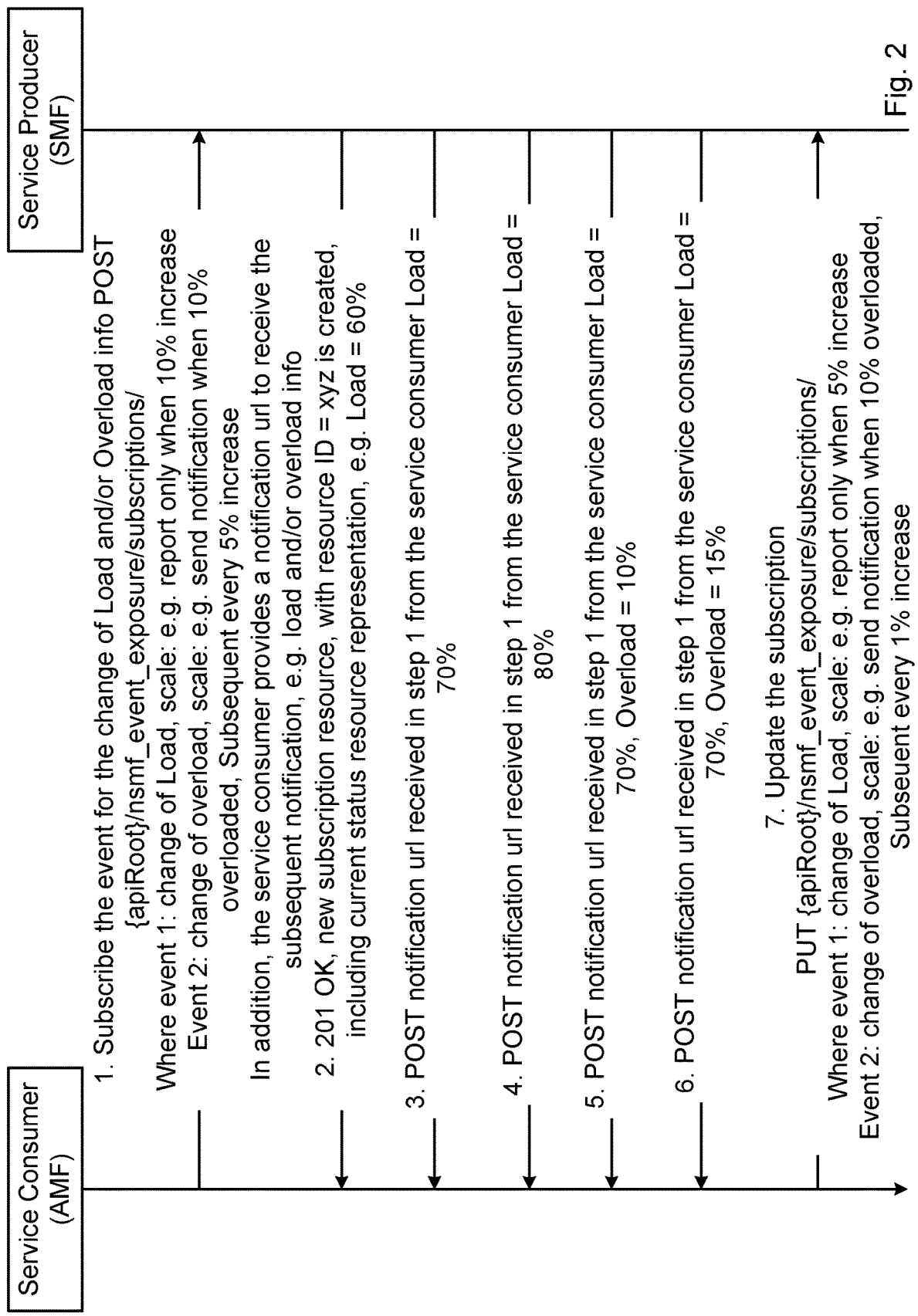
FIG. 2 schematically illustrates a method for enabling status updates in a 5G core network according to an embodiment.

An embodiment for status subscription in a 5GC is illustrated in FIG. 2. The embodiment shows updates of load/overload information, as an event to be exposed as part of event exposure services offered by a service producer SMF.

The load and/or overload information may be one event of network capability exposure, or may be used as a standalone service, and use supported Event Exposure Service application programming interface (API) (if existing network capability exposure is re-used) or similar, to get any notification of the changes of load and/or overload information. For example, the AMF service Namf_event_exposure, beside what specified in TS 23.502, chapter 5.2.2.3 and 5.4.2, Load and/or Overload information, may be added in addition to the existing events. When a service consumer of AMF service is interested in the load information of a SMF, it may subscribe this service, by creating a new subscription.

In step one, the AMF may subscribe for an event of change of load and for an event of change of overload by sending POST {apiRoot}/nsmf_event_exposure/subscriptions/, where event 1 may be change of load, scale: e.g. report only when 10% increase, and event 2 may be change of overload, scale: e.g. report only when 10% overloaded and subsequently every 5% increase in overload. In addition the AMF provides a notification URL to receive subsequent notifications.

In step two, the SMF responds OK with http response 201. A resource ID is created including a current status resource representation, e.g. load=60%. The subscription procedure is illustrated with the following load/overload changes.

In step three, the SMF posts to the received notification URL an updated load=70%, which is acknowledged by the AMF. In step four, the SMF posts an updated load=80%, which is acknowledged by the AMF. In step five, the SMF posts a load=70% and overload=10%, which is acknowledged by the AMF. In step six, the SMF posts a load=70% and an updated overload=15%, which is acknowledged by the AMF.

In step 7, the AMF updates the subscription by changing for event 1: change to of load, scale e.g. report only when 5% increase, and for event 2: change of overload, scale: e.g. report when 10% overloaded, subsequent every 1% increase, which is acknowledged by the SMF.

The presented embodiment provide the load information and its updates of a service producer, to allow such information to be available when there is a need to use, or to be available as long as there is a change.

Comparing with other alternatives, e.g. using subscribe and notify via NRF, the load information is fetched directly by the service consumer when only there is a need to use it, i.e. when the consumer need to consume the service, instead of getting notifications (through subscribe/notify) about the change of load information as long as the load information got changed in the services producers.

In addition, providing URL meets the REST API design to use Hypermedia as the engine of the application state.

A method, according to an embodiment, for enabling status updates in a 5G core network is presented with reference to FIG. 3. The method is performed in a NF service consumer node and comprises sending S130 a service discovery message to an NRF requesting a service producer candidate, receiving S140 a list comprising one or more candidates for the requested service producer, wherein the list comprises an indication of NF status for each candidate service provider in the list as well as a hypermedia link for query of current NF status of each candidate service provider in the list, sending S150 a hypermedia request to one or more service producers in the received list, requesting a current NF status, utilizing the received hypermedia links, and receiving S160 a current NF status from the one or more service producers in response to the sent request.

The received list may further comprise an indication of available hypermedia communication procedures for each candidate.

The hyper media messages may be Hypertext Transfer Protocol (HTTP) to messages or Constrained Application Protocol (CoAP) messages.

The NF status may comprise load and/or overload information for the service producer.

The method may further comprise receiving a current NF load and/or overload information from more than one service producer, and requesting services from one or more service producers in response to the received current NF load and/or overload information. The requesting services may comprise selection to achieve load balancing among the service producers.

The requesting services may comprise selection to throttle signalling to mitigate an overload of a service producer.

A method, according to an embodiment, for enabling status updates in a 5G core network is presented with reference to FIG. 4. The method is performed in an NF service producer node and comprises sending S310 a hypermedia message to an NRF, wherein the hypermedia message comprises an NF status indication and a hypermedia link for query of current NF status of the service producer, receiving S350 a hypermedia message from a service consumer by the hypermedia link, which hypermedia message request a current NF status of the service producer, and sending S360 the current NF status to the service consumer in response to the received request.

The sent hypermedia message may further comprise an indication of available hypermedia communication procedures.

The hyper media messages may be HTTP messages or CoAP messages.

The NF status may comprise load and/or overload information for the service producer.

The method may further comprise receiving S320 an acknowledge response from the NRF in response to the sending S310.

Figure 5:
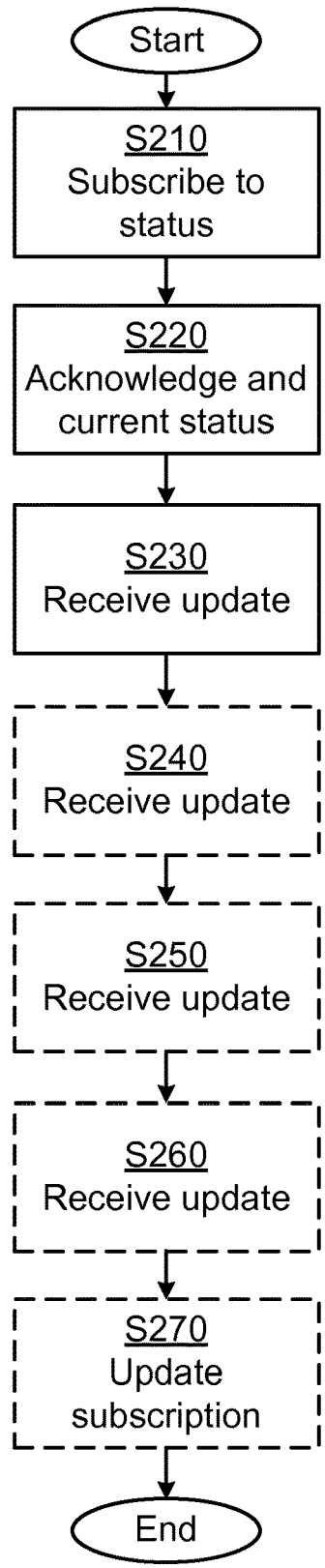

A method, according to an embodiment, for enabling status updates in a 5G core network is presented with reference to FIG. 5. The method is performed to in an NF service consumer node and comprises sending S210 a subscription request to a service producer, wherein the subscription request is a hypermedia message comprising a request for an NF status of the service producer, receiving S220 a hypermedia message from the service consumer in response to the sent subscription request, wherein the hyper media message comprises an indication of subscription acknowledgment and a current NF status of the service producer, and receiving S430 a subsequent hypermedia message from the service producer subsequent to the received indication of subscription acknowledgement from the service producer, wherein the subsequent hypermedia message comprises an indication of changed NF status and a current NF status of the service producer.

The subscription request may comprise an NF status update frequency condition, such as sending NF status only at load increment with 5%, and/or overload status with 5%, every minute or every 30 second.

The hyper media messages may be HTTP messages or CoAP messages. The NF status may comprise load and/or overload information for the service producer.

The method may further comprise sending S270 a subscription request update to the service producer, wherein the subscription request is a hypermedia message comprising an updated request for NF status of the service producer, which updated request differs form the previously sent request, and receiving an indication of subscription update acknowledgment from the service provider.

Figure 6:
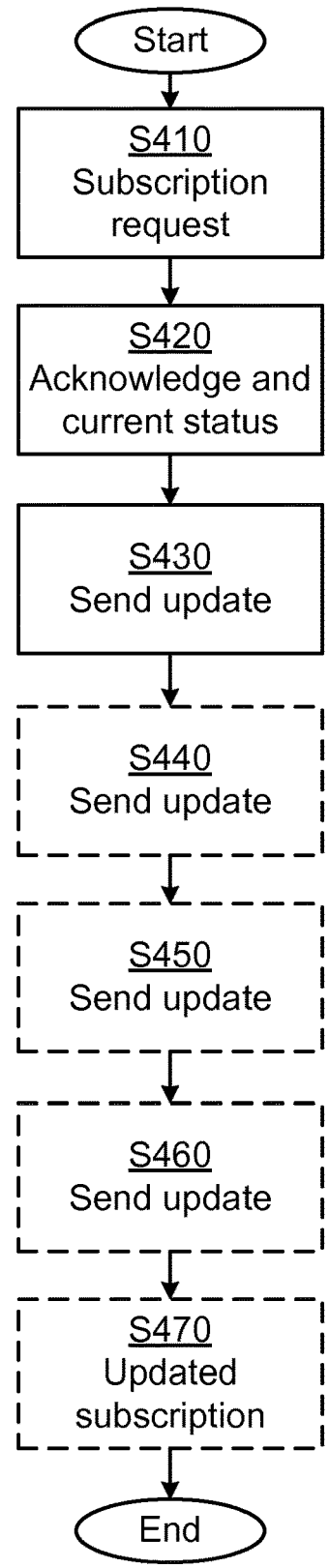

A method, according to an embodiment, for enabling status updates in a 5G core network is presented with reference to FIG. 6. The method is performed in an NF service producer node and comprises receiving S410 a subscription request from a service consumer, wherein the subscription request is a hypermedia message comprising a request for an NF status of the service to producer, sending S420 a hypermedia message to the service consumer in response the received subscription request, wherein the hyper media message comprises an indication of subscription acknowledgment and a current NF status of the service producer, and sending S430 a subsequent hypermedia message to the service consumer subsequent to the sent indication of subscription acknowledgement to the service consumer, wherein the subsequent hypermedia message comprises an indication of changed NF status and a current NF status of the service producer.

The subscription request may comprise an NF status update frequency condition, such as sending NF status only at load increment with 5%, and/or overload status with 5%, every minute or every 30 second.

The hyper media messages may be HTTP messages or CoAP messages.

The NF status may comprise load and/or overload information for the service producer.

The method may further comprise receiving S470 a subscription request update from the service consumer, wherein the subscription request update is a hypermedia message comprising an updated request for an NF status of the service producer, which updated request differs from the previously received request, and sending an indication of subscription update acknowledgment to the service consumer.

Figure 8:
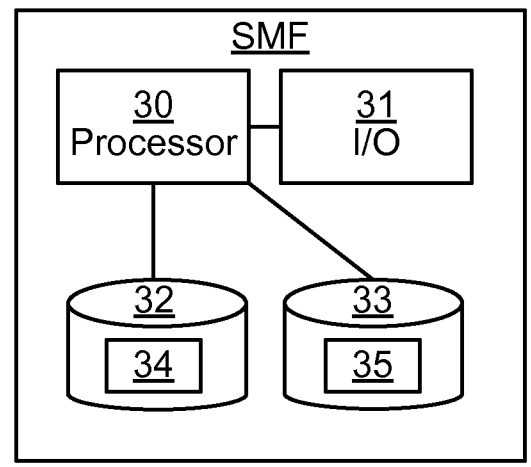

An NF service producer node, according to an embodiment, for enabling status updates in a 5G core network is presented with reference to FIG. 8. The NF service producer node comprises a processor 30 and a computer program product 32, 33 storing instructions that, when executed by the processor, causes the NF service producer node to send S310 a hypermedia message to an NRF, wherein the hypermedia message comprises an NF status indication and a hypermedia link for query of current NF status of the service producer, to receive S350 a hypermedia message from a service consumer by the hypermedia link, which hypermedia message request a current NF status of to the service producer, and to send S360 the current NF status to the service consumer in response to the received request.

The sent hypermedia message may further comprise an indication of available hypermedia communication procedures.

The hyper media messages may be HTTP messages or CoAP messages. The NF status may comprise load and/or overload information for the service producer.

The NF service producer node may further be caused to receive S320 an acknowledge response from the NRF in response to the send S310.

Figure 7:
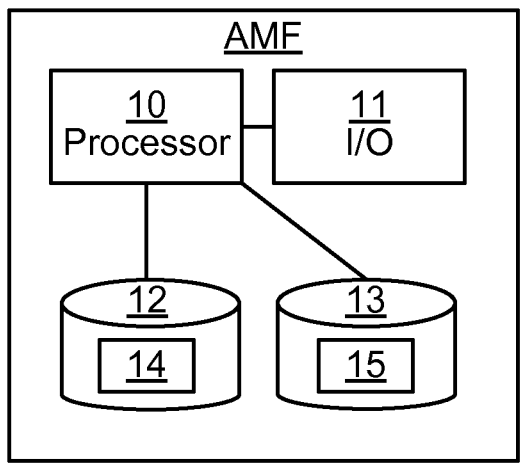
FIGS. 7 and 8 are schematic diagrams illustrating some components of devices presented herein.

An NF service consumer node, according to an embodiment, for enabling status updates in a 5G core network is presented with reference to FIG. 7. The NF service consumer node comprises a processor to and a computer program product 12, 13 storing instructions that, when executed by the processor, causes the NF service consumer node to send S130 a service discovery message to an NRF requesting a service producer candidate, to receive S140 a list comprising one or more candidates for the requested service producer, wherein the list comprises an indication of NF status for each candidate service provider in the list as well as a hypermedia link for query of current NF status of each candidate service provider in the list, send S150 a hypermedia request to one or more service producers in the received list, requesting a current NF status, utilizing the received hypermedia links, and to receive S160 a current NF status from the one or more service producers in response to the sent request.

The received list may further comprise an indication of available hypermedia communication procedures for each candidate.

The hyper media messages may be HTTP messages or CoAP messages.

The NF status may comprise load and/or overload information for the service producer. The NF service consumer node may further be caused to receive a current NF load and/or overload information from more than one service producer, and request services from one or more service producers in to response to the received current NF load and/or overload information. The request services may comprise selection to achieve load balancing among the service producers. The request services may comprise selection to throttle signalling to mitigate an overload of a service producer.

An NF service producer node, according to an embodiment, for enabling status updates in a 5G core network is presented with reference to FIG. 8. The NF service producer node comprises a processor 30 and a computer program product 32, 33 storing instructions that, when executed by the processor, causes the NF service producer node to receive S410 a subscription request from a service consumer, wherein the subscription request is a hypermedia message comprising a request for an NF status of the service producer, to send S420 a hypermedia message to the service consumer in response the received subscription request, wherein the hyper media message comprises an indication of subscription acknowledgment and a current NF status of the service producer, and to send S430 a subsequent hypermedia message to the service consumer subsequent to the sent indication of subscription acknowledgement to the service consumer, wherein the subsequent hypermedia message comprises an indication of changed NF status and a current NF status of the service producer.

The subscription request may comprise an NF status update frequency condition, such as sending NF status only at load increment with 5%, and/or overload status with 5%, every minute or every 30 second.

The hyper media messages may be HTTP messages or CoA, messages.

The NF status may comprise load and/or overload information for the service producer.

The NF service producer node may further be caused to receive S470 a subscription request update from the service consumer, wherein the subscription request update is a hypermedia message comprising an updated to request for an NF status of the service producer, which updated request differs from the previously received request, and sending an indication of subscription update acknowledgment to the service consumer.

An NF service consumer node, according to an embodiment, for enabling status updates in a 5G core network is presented with reference to FIG. 7. The NF service consumer node comprises a processor to and a computer program product 12, 13 storing instructions that, when executed by the processor, causes the NF service consumer node to send S210 a subscription request to a service producer, wherein the subscription request is a hypermedia message comprising a request for an NF status of the service producer, to receive S220 a hypermedia message from the service consumer in response the sent subscription request, wherein the hyper media message comprises an indication of subscription acknowledgment and a current NF status of the service producer, and to receive S430 a subsequent hypermedia message from the service producer subsequent to the received indication of subscription acknowledgement from the service producer, wherein the subsequent hypermedia message comprises an indication of changed NF status and a current NF status of the service producer.

The subscription request may comprise an NF status update frequency condition, such as sending NF status only at load increment with 5%, and/or overload status with 5%, every minute or every 30 second.

The hyper media messages may be HTTP messages or CoAP messages.

The NF status may comprise load and/or overload information for the service producer.

The NF service consumer node may further be caused to send S270 a subscription request update to the service producer, wherein the subscription request is a hypermedia message comprising an updated request for NF status of the service producer, which updated request differs form the previously sent request, and receiving an indication of subscription update acknowledgment from the service provider.

Figure 10:
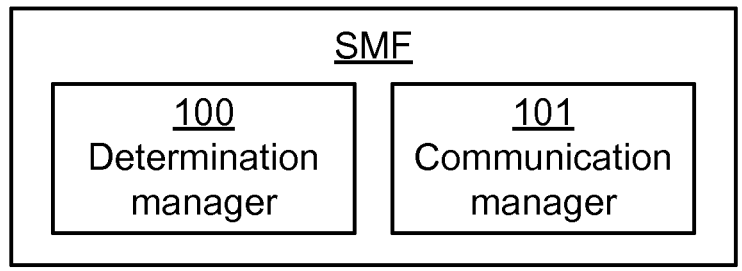

An NF service producer node, according to an embodiment, for enabling status updates in a 5G core network is presented with reference to FIG. 10. The NF service producer node comprises a communication manager lot for sending S310 a hypermedia message to an NRF, wherein the hypermedia message comprises an NF status indication and a hypermedia link for query of current NF status of the service producer, receiving S350 a hypermedia message from a service consumer by the hypermedia link, which hypermedia message request a current NF status of the service producer, and for sending S360 the current NF status to the service consumer in response to the received request.

Figure 9:
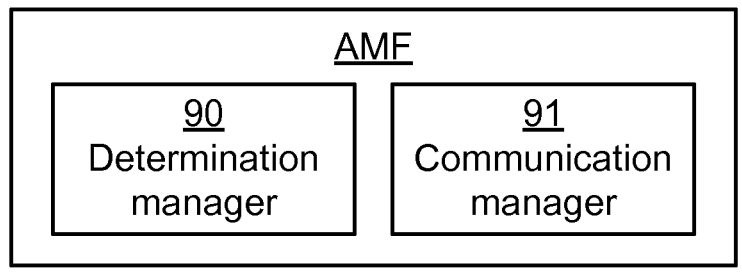
FIGS. 9 and 10 are schematic diagrams showing functional modules of devices presented herein.

An NF service consumer node, according to an embodiment, for enabling status updates in a 5G core network is presented with reference to FIG. 9. The NF service consumer node comprises a communication manager 91 for sending S130 a service discovery message to an NRF requesting a service producer candidate, receiving S140 a list comprising one or more candidates for the requested service producer, wherein the list comprises an indication of NF status for each candidate service provider in the list as well as a hypermedia link for query of current NF status of each candidate service provider in the list, sending S150 a hypermedia request to one or more service producers in the received list, requesting a current NF status, utilizing the received hypermedia links, and for receiving S160 a current NF status from the one or more service producers in response to the sent request.

An NF service producer node, according to an embodiment, for enabling status updates in a 5G core network is presented with reference to FIG. 10. The NF service producer node comprises a communication manager lot for receiving S410 a subscription request from a service consumer, wherein the subscription request is a hypermedia message comprising a request for an NF status of the service producer, sending S420 a hypermedia message to the service consumer in response the received subscription request, wherein the to hyper media message comprises an indication of subscription acknowledgment and a current NF status of the service producer, and for sending S430 a subsequent hypermedia message to the service consumer subsequent to the sent indication of subscription acknowledgement to the service consumer, wherein the subsequent hypermedia message comprises an indication of changed NF status and a current NF status of the service producer.

An NF service consumer node, according to an embodiment, for enabling status updates in a 5G core network is presented with reference to FIG. 9. The NF service consumer node comprises a communication manager 91 for sending S210 a subscription request to a service producer, wherein the subscription request is a hypermedia message comprising a request for an NF status of the service producer, receiving S220 a hypermedia message from the service consumer in response the sent subscription request, wherein the hyper media message comprises an indication of subscription acknowledgment and a current NF status of the service producer, and for receiving S430 a subsequent hypermedia message from the service producer subsequent to the received indication of subscription acknowledgement from the service producer, wherein the subsequent hypermedia message comprises an indication of changed NF status and a current NF status of the service producer.

A computer program 34, 35, according to an embodiment, for enabling status updates in a 5G core network is presented with reference to FIG. 8. The computer program comprises computer program code which, when run on an NF service producer node, causes the NF service producer node to send 8310 a hypermedia message to an NRF, wherein the hypermedia message comprises an NF status indication and a hypermedia link for query of current NF status of the service producer, receive S350 a hypermedia message from a service consumer by the hypermedia link, which hypermedia message request a current NF status of the service producer, and send S360 the current NF to status to the service consumer in response to the received request.

A computer program 14, 15, according to an embodiment, for enabling status updates in a 5G core network is presented with reference to FIG. 7, The computer program comprises computer program code which, when run on an NF service consumer node, causes the NF service consumer node to send S130 a service discovery message to an NRF, requesting a service producer candidate, receive S140 a list comprising one or more candidates for the requested service producer, wherein the list comprises an indication of NF status for each candidate service provider in the list as well as a hypermedia link for query of current NF status of each candidate service provider in the list, send S150 a hypermedia request to one or more service producers in the received list, requesting a current NF status, utilizing the received hypermedia links, and receive S160 a current NF status from the one or more service producers in response to the sent request.

A computer program 34, 35, according to an embodiment, for enabling status updates in a 5G core network is presented with reference to FIG. 8. The computer program comprises computer program code which, when run on an NF service producer node, causes the NF service producer node to receive S410 a subscription request from a service consumer, wherein the subscription request is a hypermedia message comprising a request for an NF status of the service producer, send S420 a hypermedia message to the service consumer in response the received subscription request, wherein the hyper media message comprises an indication of subscription acknowledgment and a current NF status of the service producer, and send S430 a subsequent hypermedia message to the service consumer subsequent to the sent indication of subscription acknowledgement to the service consumer, wherein the subsequent hypermedia message comprises an indication of changed NF status and a current NF status of the service producer.

A computer program 14, 15, according to an embodiment, for enabling status updates in a 5G core network is presented with reference to FIG. 7. The computer program comprises computer program code which, when run on an to NF service consumer node, causes the NF service consumer node to send S210 a subscription request to a service producer, wherein the subscription request is a hypermedia message comprising a request for an NF status of the service producer, receive S220 a hypermedia message from the service consumer in response the sent subscription request, wherein the hyper media message comprises an indication of subscription acknowledgment and a current NF status of the service producer, and to receive S430 a subsequent hypermedia message from the service producer subsequent to the received indication of subscription acknowledgement from the service producer, wherein the subsequent hypermedia message comprises an indication of changed NF status and a current NF status of the service producer.

A computer program product comprising a computer program 14, 15 or 34, 35 and a computer readable storage means on which the computer program 14, 15 or 34, 35 is stored, is also presented.

FIG. 9 is a schematic diagram showing some components of the NF service consumer node AMF. The processor to may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor to may be configured to execute methods described herein with reference to FIGS. 3 and 5.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of to software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the NF service consumer node AMF.

The NF service consumer node AMF may further comprise an input/output (I/O) interface 11 including e.g. a user interface. The network node 1 may further comprise a receiver configured to receive signalling from other nodes, and a transmitter configured to transmit signalling to other nodes (not illustrated). Other components of the NF service consumer node AMF are omitted in order not to obscure the concepts presented herein.

FIG. 9 is a schematic diagram showing functional blocks of the NF service consumer node AMF. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware.

The modules correspond to the steps in the methods illustrated in FIGS. 3 and 5, comprising a determination manager unit 90 and a communication manager unit 91. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 90 is for enabling status updates in a 5GC. This module can provide support for communication decisions. This module can to e.g. be implemented by the processor to of FIG. 7, when running the computer program.

The communication manger 91 is for enabling status updates in a 5Gc. This module corresponds to the send step S110, the acknowledge step S120, the service discovery S130, the receive candidates S140, the request step S150 and the receive step S160 of FIG. 3, and the subscribe step S210, the acknowledge step S220, the receive step S230, the receive update S240, the receive update S250, the receive update S260, and the update step S270 of FIG. 5. This module can e.g. be implemented by the processor to of FIG. 7, when running the computer program.

FIG. 10 is a schematic diagram showing some components of the NF service producer node SMF. The processor 30 may be provided using any combination of one or more of a suitable central processing unit, CPU, multiprocessor, microcontroller, digital signal processor, DSP, application specific integrated circuit etc., capable of executing software instructions of a computer program 34 stored in a memory. The memory can thus be considered to be or form part of the computer program product 32. The processor 30 may be configured to execute methods described herein with reference to FIGS. 4 and 6.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 33 in the form of a data memory may also be provided, e.g. for reading and/or storing data during execution of software instructions in the processor 30. The data memory can be any combination of read and write memory, RAM, and read only memory, ROM, and may also comprise persistent storage, which, for example, can be any single one or combination of magnetic memory, optical memory, solid state to memory or even remotely mounted memory. The data memory may e.g. hold other software instructions 35, to improve functionality for the NF service producer node SMF.

The NF service producer node SMF may further comprise an input/output (I/O) interface 31 including e.g. a user interface. The network node 1 may further comprise a receiver configured to receive signalling from other nodes, and a transmitter configured to transmit signalling to other nodes (not illustrated). Other components of the NF service producer node SMF are omitted in order not to obscure the concepts presented herein.

FIG. 10 is a schematic diagram showing functional blocks of the NF service producer node SMF. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 4 and 6, comprising a determination manager unit too and a communication manager unit lot. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 100 is for enabling status updates in a 5GC. This module can provide support for communication decisions. This module can e.g. be implemented by the processor 30 of FIG. 8, when running the computer program.

The communication manger 101 is for enabling status updates in a 5Gc. This module corresponds to the send step S310, the acknowledge step S320, the service discovery S330, the receive candidates S340, the request step S350 to and the receive step S360 of FIG. 4, and the subscribe step S410, the acknowledge step S420, the receive step S430, the receive update S440, the receive update S450, the receive update S460, and the update step S470 of FIG. 6. This module can e.g. be implemented by the processor 30 of FIG. 8, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling status updates in a 5G core network, the method comprising a network function (NF) service consumer node:
sending a service discovery message to an NF repository function (NRF) requesting a service producer candidate;
receiving a list comprising one or more candidates for the requested service producer candidate, wherein the list comprises an indication of NF status for each candidate service producer in the list as well as a hypermedia link for query of current NF status of each candidate service producer in the list;
sending a hypermedia request to one or more candidate service producers in the received list, requesting a current NF status, utilizing the received hypermedia links;
receiving a current NF status from the one or more candidate service producers in response to the sent request;
receiving a current NF load and/or overload information from more than one candidate service producer; and
requesting services from the one or more candidate service producers in response to the received current NF load and/or overload information, wherein the requesting services comprises selecting to achieve load balancing among the candidate service producers.

2. The method of claim 1, wherein the requesting services further comprises selecting to throttle signaling to mitigate an overload of a candidate service producer.

3. The method of claim 1, wherein the current NF status comprises load and/or overload information for the candidate service producer.

4. A method for enabling status updates in a 5G core network, the method comprising a network function (NF) service producer node:
receiving, from a service consumer:
a subscription request, wherein the subscription request is a hypermedia message comprising a request for an NF status of the service producer; and
a hypermedia link indicating where subsequent notifications from the service producer are to be received;
sending a hypermedia message to the service consumer in response the received subscription request, wherein the hypermedia message comprises an indication of subscription acknowledgment and a current NF status of the service producer; and
sending, via the hypermedia link, a subsequent hypermedia message to the service consumer subsequent to the sent indication of subscription acknowledgement, wherein the subsequent hypermedia message comprises an indication of changed NF status and a current NF status of the service producer.

5. The method of claim 4, further comprising:
receiving a subscription request update from the service consumer, wherein the subscription request update is a hypermedia message comprising an updated request for an NF status of the service producer, which updated request differs from the previously received request; and
sending an indication of subscription update acknowledgment to the service consumer.

6. The method of claim 4, wherein the subscription request comprises an NF status update frequency condition.

7. The method of claim 4, wherein the NF status comprises load and/or overload information for the service producer.

8. A method for enabling status updates in a 5G core network, the method comprising a network function (NF) service consumer node:
sending, to a service producer:
a subscription request, wherein the subscription request is a hypermedia message comprising a request for an NF status of the service producer; and
a hypermedia link indicating where subsequent notifications from the service producer are to be received;

receiving a hypermedia message from the service producer in response to the sent subscription request, wherein the hypermedia message comprises an indication of subscription acknowledgment and a current NF status of the service producer; and receiving, via the hypermedia link, a subsequent hypermedia message from the service producer subsequent to the received indication of subscription acknowledgement, wherein the subsequent hypermedia message comprises an indication of changed NF status and a current NF status of the service producer.

9. The method of claim 8, wherein the subscription request comprises an NF status update frequency condition.

10. The method of claim 8, wherein the NF status comprises load and/or overload information for the service producer.

11. The method of claim 8, further comprising:

sending a subscription request update to the service producer, wherein the subscription request is a hypermedia message comprising an updated request for NF status of the service producer, which updated request differs from the previously sent request; and receiving an indication of subscription update acknowledgment from the service provider.

12. A network function (NF) service consumer node for enabling status updates in a 5G core network, the NF service consumer node comprising:

processing circuitry;

memory containing instructions executable by the processing circuitry whereby the NF service consumer node is operative to:

send a service discovery message to an NF repository function (NRF) requesting a service producer candidate;

receive a list comprising one or more candidates for the requested service producer candidate, wherein the list comprises an indication of NF status for each candidate service producer in the list as well as a hypermedia link for query of current NF status of each candidate service producer in the list;

send a hypermedia request to one or more candidate service producers in the received list, requesting a current NF status, utilizing the received hypermedia links;

receive a current NF status from the one or more candidate service producers in response to the sent request;

receive a current NF load and/or overload information from more than one candidate service producer; and request services from the one or more candidate service producers in response to the received current NF load and/or overload information, wherein the requesting services comprises selecting to achieve load balancing among the service producers.

13. A network function (NF) service producer node for enabling status updates in a 5G core network, the NF service producer node comprising:

processing circuitry;

memory containing instructions executable by the processing circuitry whereby the NF service producer node is operative to:

receive, from a service consumer:

a subscription request, wherein the subscription request is a hypermedia message comprising a request for an NF status of the service producer node; and a hypermedia link indicating where subsequent notifications from the service producer are to be received;

send a hypermedia message to the service consumer in response the received subscription request, wherein the hyper media message comprises an indication of subscription acknowledgment and a current NF status of the service producer node; and send a subsequent hypermedia message to the service consumer subsequent to the sent indication of subscription acknowledgement to the service consumer, wherein the subsequent hypermedia message comprises an indication of changed NF status and a current NF status of the service producer node.

14. A network function (NF) service consumer node for enabling status updates in a 5G core network, the NF service consumer node comprising:

processing circuitry;

memory containing instructions executable by the processing circuitry whereby the NF service consumer node is operative to:

send, to a service producer:

a subscription request, wherein the subscription request is a hypermedia message comprising a request for an NF status of the service producer; and a notification link to the service producer indicating where subsequent notifications from the service producer are to be received;

receive a hypermedia message from the service producer in response the sent subscription request, wherein the hypermedia message comprises an indication of subscription acknowledgment and a current NF status of the service producer; and receive, via the notification link, a subsequent hypermedia message from the service producer subsequent to the received indication of subscription acknowledgement from the service producer, wherein the subsequent hypermedia message comprises an indication of changed NF status and a current NF status of the service producer.

* * * * *